UNITED STATES PATENT OFFICE.

BENONI H. HOWELL, OF NEW YORK, N. Y.

IMPROVED COMPOSITION FOR LINING BARRELS.

Specification forming part of Letters Patent No. 47,825, dated May 23, 1865.

*To all whom it may concern:*

Be it known that I, BENONI H. HOWELL, of the city and State of New York, have invented, made, and applied to use a certain new and useful Composition for Lining Barrels for Petroleum, &c.; and I do hereby declare the following to be a full, clear, and exact description of the nature of the said invention.

Barrels containing petroleum and similar oils are very liable to leak and cause considerable waste in transportation, as well as loss by the amount of oil absorbed by the wood itself. Various compounds have been proposed for lining barrels to prevent this waste.

The nature of my said invention consists in a composition for lining barrels for petroleum, &c., that prevents the wood absorbing the petroleum or the barrel leaking.

My compound is composed of liquid glass or silica mixed with very finely-ground wood-charcoal in about the proportion of six measures of liquid glass or liquid silica to one measure of pulverized charcoal. These substances are thoroughly mixed or ground together, and poured into the barrel to be coated. Said barrel is then turned around, so that the compound flows over the entire inner surface, after which the said compound is emptied out, and the operation may be repeated after the first coating is dry.

I find that the pulverized charcoal is unacted on by the petroleum, and gives a body to the liquid silica that prevents the same cracking and becoming oxidized by the action of the atmosphere or the oil. Thereby a durable and cheap lining composition is obtained for barrels to contain petroleum, &c.

What I claim, and desire to secure by Letters Patent, is—

The composition specified for lining barrels for petroleum, &c.

In witness whereof I have hereunto set my signature this 1st day of April, 1865.

B. H. HOWELL.

Witnesses:
CHAS. H. SMITH,
JAMES E. SEWELL, Jr.